INVENTOR.
JACK C. GASKINS
BY Newton, Hopkins,
Jones & Ormsby
ATTORNEYS

United States Patent Office 3,481,221
Patented Dec. 2, 1969

3,481,221
VARIABLE SPEED TRANSMISSION
Jack C. Gaskins, Lanett, Ala., assignor to Batson-Cook Company, West Point, Ga., a corporation of Georgia
Filed Mar. 17, 1967, Ser. No. 623,948
Int. Cl. F16h 37/00
U.S. Cl. 74—689                                     3 Claims

ABSTRACT OF THE DISCLOSURE

A variable speed transmission unit having an output means an an input means and which utilizes a speed changing mechanism including a pair of variable pitch pulleys connected by a flexible V-belt wherein only a minority of the input power is transmitted to the output means through the speed changing mechanism. A planetary gear arrangement is connected to the input to the transmission and includes a housing connected to the speed changing mechanism and rotatably carrying an input member connected to the input means of the transmission, an output member keyed to the output means of the transmission, and a transfer member connecting the input member and the output member.

BACKGROUND OF INVENTION

Field of invention

This invention relates generally to variable speed transmissions having a flexible V-belt drive and more particularly to a variable speed transmission in which the major portion of the power transmitted through the transmission is not transmitted through the flexible V-belt drive.

Prior art

Variable speed transmisisons utilizing a driving and a driven pulley connected by flexible V-belt are well-known in the art today. The pulleys utilized by these variable speed transmissions have a variable effective diameter in order to vary the speed of the driven pulley with respect to the driving pulley. This provides a selectively variable output speed with respect to the input speed of the transmission.

In almost all of the prior art variable speed transmissions, the majority of the power transmitted through the transmission is carried by the flexible V-belt extending between the driving and driven pulleys. One disadvantage with these variable speed transmissions is that the flexible V-belt tends to slip with respect to the pulleys when the power load transmitted therethrough is relatively great. This, then, results in limiting the maximum power load that can be transmitted through the variable speed transmission.

The flexible V-belt wears rapidly when transmitting a heavy power load. This results in greatly increasing the maintenance cost and decreasing the operating efficiency of the transmission.

Moreover, the ratio of input to output speed of these variable speed transmissions, although assumed constant, fluctuate over a small range due to load and speed regulation. These fluctuations of input to output speed ratio of prior art variable speed transmissions are greater than the material being processed can stand.

SUMMARY OF THE INVENTION

The invention disclosed herein overcomes these and other problems associated with the prior art variable speed transmissions in that only a very small portion of the total power load transmitted through the transmission unit is transmitted by the flexible V-belt connecting the pulleys of the speed control mechanism of the transmission unit. The input to output speed ratio fluctuations are reduced because most of the power is transmitted through direct gearing. This results in increasing the maximum power load which can be transmitted through the variable speed transmission unit. Moreover, the overall operating efficiency of the transmission is increased and the maintenance cost thereof is decreased.

The apparatus of the invention comprises generally a transmission unit utilizing a pair of conventional variable pitch pulleys connected by a flexible V-belt to give the transmission unit an output speed changing ability. The apparatus differs from the prior art in that the shaft connected to one of the pulleys is connected to a housing of a planetary gear arrangement and the other pulley is connected to the output shaft of the transmission unit. One end of the output shaft of the transmission unit is connected to the output shaft of the planetary gear arrangement and the input shaft of the planetary gear arrangement serves as the input to the transmission unit. This variable speed unit is used between components of a line process machine and the power flow may be in either direction, pulling or holding back, depending on the requirements of the process.

These and other features and advantages of the invention will be more clearly understood upon consideration of the following detailed description and accompanying drawings wherein like characters of reference designate corresponding parts throughout, and in which:

Figures 1, 2:
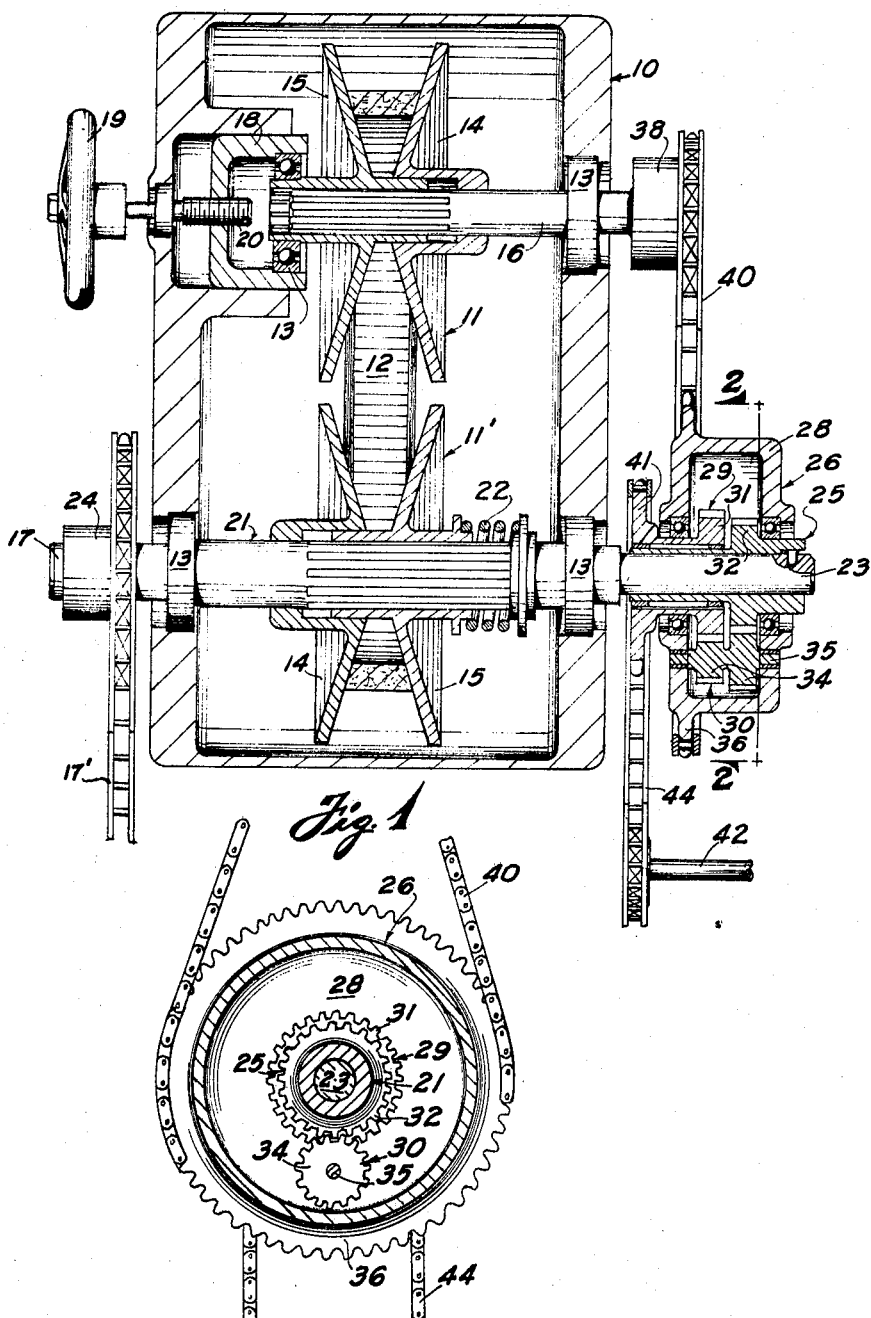
FIG. 1 is a transverse cross-sectional view of a variable speed transmission unit according to the invention.
FIG. 2 is a cross-sectional view taken along the line 2—2 in FIG. 1.

These figures and the following detailed description disclose a specific embodiment of the invention, however, the inventive concept is not limited thereto since it may be embodied in other forms.

ILLUSTRATIVE EMBODIMENT

Referring to FIG. 1, it will be seen that the embodiment of the invention includes a housing 10 rotatably carrying a pair of variable pitch pulleys 11 and 11' on splined shafts 16 and 21 rotatably mounted in the housing 10 by bearings 13. These pulleys 11 and 11' operate in conjunction with a flexible V-belt 12 to selectively change the relative speed of rotation between the pulleys 11 and 11'. Each of the variable pitch pulleys 11, 11' includes a fixed pulley section 14 and a movable pulley section 15. Therefore, it can be seen by appropriately moving the movable pulley sections 15 with respect to the fixed pulley sections 14, the effective diameters of the pulleys 11, 11' can be changed so as to vary the relative speed of rotation between the pulleys.

The movable section 15 of the pulley 11 is slidable yet drivingly mounted on the splined shaft 16 to which the fixed pulley section 14 is attached and is positioned along the shaft 16 by an adjustment cup 18 adjustably positioned with respect to the housing 10 by a hand wheel 19 having a threaded stud 20 extending therefrom and engaging the cup 18. The stud 20 is rotatable in yet axially fixed by the housing 10 so that rotation of the hand wheel 19 selectively moves the cup 18 with respect to the housing 10 and the fixed pully section 14 carried by the shaft 16 so that the effective diameter of the pulley 11 can be varied.

The fixed pulley section 14 of the pulley 11' is fixedly mounted on the shaft 21 and the movable pulley section 15 of the pulley 11' is slidably yet drivingly carried by the splined shaft 21. A spring 22 is effective to constantly urge the movable pulley section 15 toward the fixed pulley section 14 so that, as the effective diameter of the pulley 11 is increased by movement of the hand wheel 19, the effective diameter of the pulley 11' will be correspondingly decreased under the action of the spring 22, or vice-versa.

The shaft 21 is the output shaft of the variable speed transmission unit and carries at one end 17 thereof an output member 24 which can be selectively connected to appropriate machinery to drive the same, as by chain drive 17'. The other end 23 of the shaft 21 is keyed to the output member 25 of a planetary gear arrangement 26. The planetary gear arrangement 26 includes a housing 28 which rotatably mounts therein an input member 29 and the output member 25. The housing 28 also rotatably mounts a transfer member 30 which is effective to engage the input member 29 and the output member 25 so that power may be transmitted through the planetary gear arrangement 26.

As seen from the drawings, the input member 29 includes a spur gear 31, the output member 25 includes a spur gear 32, and the intermediate member 30 includes a pair of spur gears 34 meshing with the spur gears 31 and 32 and having a common shaft 35 rotatably mounted in the housing 26. The housing 28 includes a sprocket 36 around the periphery thereof which is connected to a driving sprocket 38 carried by one end of shaft 16 through a drive chain 40 extending therebetween.

An input member 41 is connected to the input member 29 of the planetary gear arangement 26 and is in turn connected to a power source such as shaft 42 through a drive chain 44. It will thus be understood that as the shaft 42 drives the input member 29 of the planetary gear arrangement 26, the input member 29 will drive the transfer member 30 which in turn drives the output member 25 and to drive the housing 28 of the planetary gear arrangement 26 which in turn tends to rotate the drive sprocket 38 connected to the shaft 16. Therefore, part of the total power is transmitted through the flexible V-belt 12 and part of the total power is transmitted by the output member 25 of the planetary gear arrangement 26.

It is this power that is tranmitted from the housing 28 through the flexible V-belt 12 that controls the speed of the output shaft 21 relative to the input shaft 42. That portion of the power load transmitted to the shaft 21 by the V-belt 12 is added to that portion of the power load transmitted to the shaft through the member 25 so that the total power load is carried by the output member 24. It will also be noted that the major portion of the total power load is transmitted to the shaft 21 through the member 25 due to the particular mechanical advantage that can be obtained by the use of the planetary gear arrangement 26.

By using the particular arrangement set forth hereinabove, it will also be seen that the input output speed ratio fluctuations of the transmission unit will be reduced because the percent slip of variable speed section of this transmission unit will have very little effect on the input-output speed ratio. Therefore, once the input output speed ratio of the transmission unit is set, it will more accurately maintain this ratio even though the variable speed section of this transmission unit will still have its normal load and speed regulation.

The particular arrangement set forth herein allows a change in output speed with respect to input speed over a relative narrow speed range. This problem is overcome by the ease with which the planetary gear arrangement 26 may be changed to another planetary gear arrangement 26 having a different speed changing range since the member 25 is keyed to the shaft 21. Therefore, a wide range of output speeds with respect to input speed can easily be achieved by using different planetary gear arrangements 26.

Although a specific embodiment of the invention has been disclosed herein, it is understood that other embodiments thereof may be resorted to without departing from the scope thereof as set forth by the appended claims.

What is claimed as the invention is:

1. A variable speed transmission unit comprising:
   (a) power input means;
   (b) a speed changing mechanism including a support housing, a first shaft rotatably journalled in said housing with a power input end extending from one side of said housing and a power output end extending from the other side of said housing, a second shaft rotatably journalled in said housing parallel to and spaced from said first shaft with a secondary power input end extending from said housing and aligned with said power input end of said first shaft, and an adjustable sheave and belt arrangement operatively connecting said first shaft with said second shaft within said housing to selectively vary the speed of rotation of said first shaft with respect to said second shaft;
   (c) power output means connected to said power output end of said first shaft;
   (d) power dividing means connecting said power input end of said first shaft and said secondary power input end of said second shaft with said power input means exteriorly of said support housing, said power dividing means including a planetary gear arrangement having a gear housing, a primary input member, a primary output member and a transfer member, said transfer member operatively connecting said primary input member to said primary output member, said primary input member being operatively connected to said power input means, said primary output member being operatively connected to said power input end of said first shaft exteriorly of said support housing, and said gear housing being connected to said secondary power input end of said second shaft exteriorly of said support housing, said primary output member being effective to transfer the majority of the input power directly to said first shaft, said gear housing being effective to transmit a minority of the input power to said second shaft and through said speed changing mechanism back to said first shaft, said primary output member being removably keyed to said power input end of said first shaft exteriorly of said support housing to facilitate the quick and easy removal of said planetary gear arrangement from said power input end of said first shaft.

2. A variable speed transmission unit as set forth in claim 1 wherein said adjustable sheave and belt arrangement includes a pair of variable pitch pulleys, a flexible V-belt connecting said pulleys, and means for varying the effective diameter of said pulleys, one of said pulleys being carried by said first shaft and the other of said pulleys being carried by said second shaft.

3. A variable speed transmission unit as set forth in claim 2 further including a power source connected to said power dividing means for driving said primary input means.

References Cited

UNITED STATES PATENTS

| 581,286 | 4/1897 | Heywood | 74—689 |
| 2,049,065 | 7/1936 | Kahn | 74—689 |
| 1,746,029 | 2/1930 | Chorlton | 74—689 |
| 2,164,818 | 7/1939 | Heyer et al. | 74—689 |
| 3,000,584 | 9/1961 | Clem | 74—689 X |
| 3,354,748 | 11/1967 | Chapman | 74—689 |

FOREIGN PATENTS

| 879,157 | 10/1961 | Great Britain. |
| 227,479 | 9/1943 | Switzerland. |

DONLEY J. STOCKING, Primary Examiner

T. C. PERRY, Assistant Examiner